United States Patent [19]

Dotti

[11] 4,037,278
[45] July 26, 1977

[54] DEVICE FOR COUPLING A CARDAN HALF-JOINT WITH A FIXED STRUCTURE

[75] Inventor: Giuseppe Dotti, Milan, Italy

[73] Assignee: Snam Progetti S.p.A., Milan, Italy

[21] Appl. No.: 637,125

[22] Filed: Dec. 3, 1975

[30] Foreign Application Priority Data

Dec. 3, 1974   Italy .................................. 30122/74

[51] Int. Cl.² ........................................... B63B 21/52
[52] U.S. Cl. ...................................... 9/8 R; 116/107;
102/13; 403/57; 403/79
[58] Field of Search ............... 403/158, 157, 159, 344,
403/57, 79; 64/17 R, 17 A; 9/8 R; 102/13;
116/107

[56] References Cited

U.S. PATENT DOCUMENTS

| 1,071,377 | 8/1913 | Wilkinson | 64/17 R |
| 1,328,092 | 1/1920 | Maltry et al. | 403/344 X |
| 2,037,209 | 4/1936 | Buckwalter | 403/158 |
| 2,474,529 | 6/1949 | Hullinger | 64/17 R |
| 2,516,472 | 7/1950 | MacKeage, Jr. | 403/336 |

Primary Examiner—Andrew V. Kundrat
Attorney, Agent, or Firm—Ralph M. Watson

[57] ABSTRACT

In a device for coupling a cardan half-joint with a fixed structure, such as a device for the subsea anchoring of a structure which uses cardan joints, the improvement consisting in that the half joint is of the cross-beam type and the main forks are formed by two half shells and there is an undercut abutment having the shape of a poppet. A better distribution of the pull stresses on the members of the joint is thus obtained, means being also provided to prevent the rotation of the joint.

1 Claim, 2 Drawing Figures

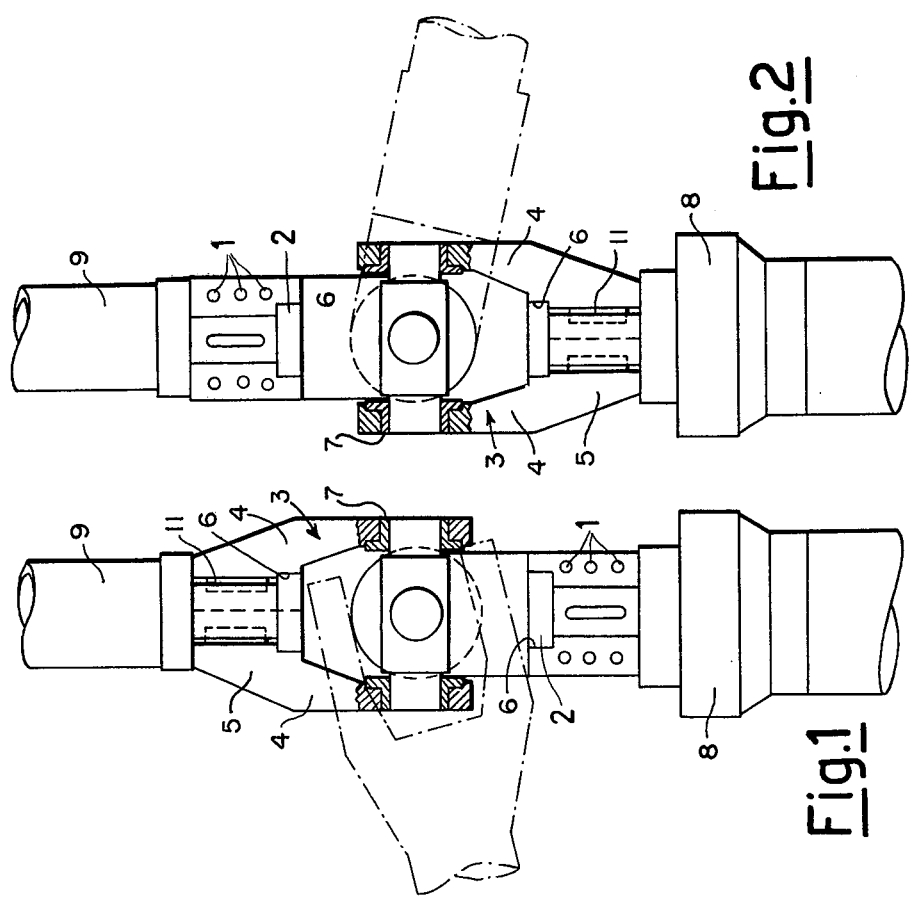

DEVICE FOR COUPLING A CARDAN HALF-JOINT WITH A FIXED STRUCTURE

This invention relates to a device which permits the coupling of a Cardan half-joint with a fixed structure. More particularly, the present invention relates to a device for the subsea anchoring of a structure which utilizes cardan universal joints. Specifically, the present invention relates to a device for the subsea anchoring applicable to the articulated leg buoy according to the Italian Pat. No. 900 308 of the same Applicant.

At the present status of the art, the means which provide a rigid coupling between a cardan half-joint and a fixed structure are essentially constituted by two flanges, which are coupled by a set of bolts.

It is apparent that in such a case the pull stresses to which the junctions in question are subjected, are distributed over the area formed by the sum of the cross-sectional areas of the bolts, an area which is comparatively small due to the configuration of the junction as such. Consequently, the bolts undergo extremely high pull stresses, with the attendant hazard of possible breakages and thus frequent replacements.

It should be borne in mind, moreover, that, inasmuch as these devices are used, in the majority of the cases, in highly corrosive environments, it is not possible to find, for the construction of such bolts, materials which combine at the same time the properties of a high corrosion resistance and a high tensile strength.

It has now been surprisingly found that it is possible to obtain a device comprising a twin-shell cardan half-joint which can be disassembled without having bolts under the maximum tensile pull and equipped with an appropriate undercut, which, while on the one hand permits to increase the pull-withstanding area and thus diminishes the forces which stress the joint, on the other hand does away with the presence of bolts stressed by high pulling forces, and consequently the possibility of frequent breakages is diminished while a more robust and reliable coupling can be provided for. More precisely, such a device is such that the pulling stresses are evenly distributed over the surface as formed by the specially provided undercut abutment in the shape of a shaft and projection or a similar form which is appropriately located on the end of the fixed structure.

As outlined above, it is apparent that the cross-sectional area intended to bear the pulling stress is wider than the area which is the sum of the cross-sectional areas of the individual bolts.

The means which has been resorted to for clamping the two shells onto the undercut portion, is formed by a set of bolts which are now pulled along a direction which is perpendicular to that of the maximum pulling stress and have now the only task of keeping the two shells united and thus they are not subjected to heavy pulling stresses transferred by the structure.

More particularly, if it is desired to prevent the rotation of the joint, the undercut part on which the two shells are tightened, is equipped with specially provided keys or dowels or any other means which counteracts the rotation (for example, a square cross-sectional outline, a hexagonal one, a toothed one and similar expedients).

In the specific case of a buoy having articulated legs, the undercut abutment is united both to the foundation pillar and to the buoy body itself.

More particularly, as outlined above, such a device can be used as a subsea anchoring means for buoys having articulated legs which are referred to in this specification which explains the invention without limiting the scope thereof.

In connection with the accompanying drawings, the device formed by a cardan half-joint with a double dismemberable shell is illustrated.

The deviced as shown in

FIGS. 1 and 2 is device which uses a cross-type cardan joint, the main forks of which are the seats of the cross-pin and which are formed by two half-shells, which can be mounted and/or disassembled by bolts.

As illustrated the device includes a pair of opposing main forks 3, each one of which is formed from two half shells and includes a pair of spaced prongs 4, a depending shank 5, and an undercut portion or seat 6 adjacent to the prongs 4.

As shown the opposing forks 3 are held in engagement by the cross pin 7. Also the forks 3 are secured to a foundation pillar 8 and a leg 9 of a buoy (not shown). Extending from the pillar 8 and leg 9 are undercut abutments 2. Each abutment 2 includes a shaft 10 having a projection 11 which is seated in its respective undercut portion or seat 6.

The forks 3 are assembled about the undercut abutments 2 by the bolts 1. In operation the pull load on the shell is not absorbed by the bolt system 1, which is thus released from this kind of stress, but rather by each of the specially provided undercut abutments 2, which absorb the pulling loads, both static and dynamic, acting upon the joint. To prevent the rotation of the joint, the undercut portion 7 is shaped in circular cross-section with a double key 11. The undercut abutment 2 is then welded both to the foundation pillar and the legs of the buoy (not shown).

What we claim is:

1. A device anchoring a structure below sea level, comprising:
    a pair of opposing forks, each of which has a pair of opposing prongs, a shank connected to said prongs, and a seat in said shank adjacent to where said prongs diverge from one another,
    a cross pin extending through said prongs which unite said opposing forks,
    opposing shafts to which said forks are secured, wherein one of said shafts is anchored below sea level and the other one of which is connected to a movable body, and wherein each of said shafts includes a radial projection adapted to be received by a recess in each of said seats of each of said forks, and
    a plurality of bolts which extend through each of said shanks of said forks in a direction perpendicular to the pull forces on said forks for securing said forks to said shafts without being subjected to pull forces on said shafts.

* * * * *